(12) United States Patent
Shirai

(10) Patent No.: US 6,459,778 B1
(45) Date of Patent: Oct. 1, 2002

(54) CONNECTED APPARATUS DETECTION SYSTEM

(75) Inventor: Kouji Shirai, Tokyo (JP)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 09/664,330

(22) Filed: Sep. 18, 2000

(30) Foreign Application Priority Data

Sep. 20, 1999 (JP) .......................................... 11-266012

(51) Int. Cl.[7] .............................................. H04M 11/00
(52) U.S. Cl. .............................. 379/93.29; 379/93.05; 455/557
(58) Field of Search ..................... 379/93.29–93.34, 379/93.05–93.07, 90.01, 110.01; 455/556, 557

(56) References Cited

U.S. PATENT DOCUMENTS 4,788,717 A * 11/1988 Blanchard et al. ........ 379/93.29
5,249,218 A * 9/1993 Sainton .................... 379/93.29
5,610,941 A * 3/1997 Tanaka et al. ............ 379/93.29

FOREIGN PATENT DOCUMENTS

JP 6-244985 9/1994

* cited by examiner

Primary Examiner—Wing F. Chan
(74) Attorney, Agent, or Firm—Foley & Lardner

(57) ABSTRACT

A connected apparatus detection system for externally transmitting and receiving information of an information apparatus by means of a communication function of a communication apparatus, with the communication apparatus and the information apparatus connected, in which a signal line for use in the connection between the communication apparatus and the information apparatus includes an external apparatus connection detection line for transmitting and receiving a connection detection signal indicating whether the communication apparatus and the information apparatus are connected or not, the information apparatus has a function of transmitting an identification signal indicative of information which specifies a kind of the information apparatus through the external apparatus connection detection line, and the communication apparatus has a function of receiving the identification signal to change setting of the communication apparatus into setting contents adapted to the information apparatus.

29 Claims, 6 Drawing Sheets

CONNECTED APPARATUS DETECTION SYSTEM

BACKGROUND OF THE INVENTION

1. Field of the Invention

The present invention relates to a connected apparatus detection system for automatically detecting, in the connection between a communication apparatus and an information apparatus, information such as a kind of apparatus as a connection destination to conduct appropriate setting for communication and the like.

2. Description of the Related Art

For conducting information communication outdoors such as electronic mail and Internet, it is a common practice to connect various information apparatuses including a note-type personal computer and PDA (Personal Digital Assistants) to various kinds of communication apparatuses such as a portable phone, PHS and a public phone.

Kinds of information apparatuses and communication apparatuses thus having a connection function are many, of which many have their own unique functions and specifications. For the communication with each of such apparatus or for using a unique function etc. of each apparatus in the connection between an information apparatus and a communication apparatus, it is necessary to refer to a kind of apparatus of a connection destination to change setting contents into those adapted to the apparatus of the connection destination.

This is, as illustrated in FIG. 6, to use setting A for the connection of a communication apparatus with an information apparatus A and setting B for the connection with an information apparatus B.

Since the connection between the information apparatus and the communication apparatus can be freely changed, various modes of use are possible in addition to the use of the information apparatus and the communication apparatus connected, such as the use of each apparatus separated from each other, and the use with a connection changed frequently such as the use of a plurality of kinds of information apparatuses or communication apparatuses whose combination for connection is changed as required. However, for adapting setting of an apparatus to an apparatus as a connection destination, it is a conventional practice to conduct minute setting change operation through manual input, which requires complicated work for the setting.

Under these circumstances, demanded is a system in which each apparatus automatically detects a kind of apparatus as a connection destination and automatically changes its setting contents into those adapted to the connection destination apparatus.

Conventional system in which a communication apparatus detects a kind of an information apparatus to be connected to and conducts transmission and reception of communication adapted to the detection result is, for example, disclosed in Japanese Patent Laying-Open (Kokai) No. Heisei 06-244985. The system conducts identification whether a signal sent from an information apparatus is an analog signal or a digital signal and detection of the information apparatus being activated or not, thereby automatically conducting communication adapted to an analog signal such as voice and a digital signal such as data of information communication.

At preset, a common signal line connecting a communication apparatus and an information apparatus includes, other than a line for communication of data transmitted and received, an external apparatus connection detection line which is a dedicated line for detecting an apparatus as a connection destination being connected (activated) or not, by which line information about whether the apparatus of the connection destination is connected or not can be obtained.

As described in the foregoing, conventional connected apparatus detection systems for detecting information such as a kind of apparatus as a connection destination have the following problems.

First, the conventional systems only conduct detection of activation and inactivation of an apparatus connected and identification of a signal for use in communication as an analog signal or a digital signal and fails to detect detailed information such as a kind of apparatus as a connection destination which information is required for adapting setting to the connection destination apparatus.

Secondly, among conventional methods of automatically obtaining information regarding a connection destination are a method of sending information regarding a connected apparatus being embedded into other information to be transmitted by expanding a format of an existing signal for use in information transmission and reception and a method which needs a new line for transmitting information regarding a connection destination in addition to a signal line for use in connection, all of which methods are different from the existing standards for use in connection and have a problem in the connection with a common existing apparatus.

According to the above-described conventional technique disclosed in Japanese Patent Laying-Open (Kokai) No. Heisei 06-244985 by which information (whether analog signal or a digital signal is used etc.) of an apparatus as a connection destination is transmitted being DC-superposed on a data signal line/voice signal line, connection with other common existing apparatuses which are not adapted to this function results in having the DC-superposed signal overlapping received data such as voice.

Thirdly, although in communication apparatuses such as a portable phone, many operations are executed by making a selection from a range of selection displayed on a display screen of a display, conventional systems fail to detect a kind of function that an information apparatus as a connection destination has, so that the displayed range of selection of operations can not be adapted to the functions that the information apparatus as a connection destination has. Therefore, usable functions that the connection destination apparatus has and functions enabling execution of instructions from a user disagree with each other to have low operability and make user's operation of the apparatus complicated.

SUMMARY OF THE INVENTION

A first object of the present invention is to provide a connected apparatus detection system which eliminates the above-described shortcomings of the conventional art and is capable of automatically conducting appropriate setting for communication etc. adapted to an apparatus as a connection destination without the need of complicated setting work every time new connection or switching is made.

A second object of the present invention is to provide a connected apparatus detection system eliminating the above-described shortcomings of the conventional art and adaptable to a connection with an apparatus of an existing standard, in which in a new function of communicating information regarding a kind of apparatus, transmission is conducted through a signal line of an existing standard without the need of a new line for transmitting the information and even when the information is erroneously transmitted to an apparatus having no reception function, no false transmission data is generated.

A third object of the present invention is provide a connected apparatus detection system eliminating the above-described shortcomings of the conventional art and having excellent operability without confusing users which is realized by, in user's operation of an apparatus connected, preventing disagreement between a usable function that an apparatus as a connection destination has and a function enabling execution of an instruction from the user, adapting to different functions usable when a connection is established with the connection destination apparatus and when the same is not and adapting a function enabling execution of an instruction from a user to a currently usable function in practice.

According to one aspect of the invention, system for externally transmitting and receiving information of an information apparatus by means of a communication function of a communication apparatus, with the communication apparatus and the information apparatus connected, wherein a signal line for use in the connection between the communication apparatus and the information apparatus includes an external apparatus connection detection line for transmitting and receiving a connection detection signal indicating whether the communication apparatus and the information apparatus are connected or not, the information apparatus has a function of transmitting an identification signal indicative of information which specifies a kind of the information apparatus through the external apparatus connection detection line, and the communication apparatus has a function of receiving the identification signal to change setting of the communication apparatus into setting contents adapted to the information apparatus.

In the preferred construction, the communication apparatus has a function of transmitting an identification signal indicative of information which specifies a kind of the communication apparatus to the information apparatus through the external apparatus connection detection line.

In another preferred construction, the connection detection signal has a signal mode of transmitting information using two kinds of signals, and the communication apparatus, when predetermined one of the two kinds of signals is transmitted as the connection detection signal, determines that the communication apparatus and the information apparatus are connected and when the other signal is transmitted, determines that the communication apparatus and the information apparatus are yet to be connected.

In another preferred construction, the connection detection signal has a signal mode of transmitting information using two kinds of signals, and the communication apparatus has a function of transmitting an identification signal indicative of information which specifies a kind of the communication apparatus to the information apparatus through the external apparatus connection detection line, and when predetermined one of the two kinds of signals is transmitted as the connection detection signal, determines that the communication apparatus and the information apparatus are connected and when the other signal is transmitted, determines that the communication apparatus and the information apparatus are yet to be connected.

In another preferred construction, an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal.

In another preferred construction, the communication apparatus has a function of transmitting an identification signal indicative of information which specifies a kind of the communication apparatus to the information apparatus through the external apparatus connection detection line, and an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal.

In another preferred construction, the connection detection signal has a signal mode of transmitting information using two kinds of signals, the communication apparatus, when predetermined one of the two kinds of signals is transmitted as the connection detection signal, determines that the communication apparatus and the information apparatus are connected and when the other signal is transmitted, determines that the communication apparatus and the information apparatus are yet to be connected, and an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal.

In another preferred construction, the connection detection signal has a signal mode of transmitting information using two kinds of signals, the communication apparatus has a function of transmitting an identification signal indicative of information which specifies a kind of the communication apparatus to the information apparatus through the external apparatus connection detection line, and when predetermined one of the two kinds of signals is transmitted as the connection detection signal, determines that the communication apparatus and the information apparatus are connected and when the other signal is transmitted, determines that the communication apparatus and the information apparatus are yet to be connected, and an apparatus as a transmission source of the as identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal.

In another preferred construction, detection of a connection between the communication apparatus and the information apparatus by the connection detection signal is periodically executed.

In another preferred construction, the communication apparatus has a function of transmitting an identification signal indicative of information which specifies a kind of the communication apparatus to the information apparatus through the external apparatus connection detection line, and detection of a connection between the communication apparatus and the information apparatus by the connection detection signal is periodically executed.

In another preferred construction, the connection detection signal has a signal mode of transmitting information using two kinds of signals, the communication apparatus, when predetermined one of the two kinds of signals is transmitted as the connection detection signal, determines that the communication apparatus and the information apparatus are connected and when the other signal is transmitted, determines that the communication apparatus and the information apparatus are yet to be connected, and detection of a connection between the communication apparatus and the information apparatus by the connection detection signal is periodically executed.

In another preferred construction, the connection detection signal has a signal mode of transmitting information using two kinds of signals, the communication apparatus has a function of transmitting an identification signal indicative of information which specifies a kind of the communication apparatus to the information apparatus through the external apparatus connection detection line, and when predetermined one of the two kinds of signals is transmitted as the connection detection signal, determines that the communication apparatus and the information apparatus are connected and when the other signal is transmitted, determines that the communication apparatus and the information apparatus are yet to be connected, and detection of a connection between the communication apparatus and the information apparatus by the connection detection signal is periodically executed.

In another preferred construction, an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal, and detection of a connection between the communication apparatus and the information apparatus by the connection detection signal is periodically executed.

In another preferred construction, when a connection between the communication apparatus and the information apparatus is detected, detection of a kind of connected apparatus by the identification signal is periodically executed.

In another preferred construction, the communication apparatus has a function of transmitting an identification signal indicative of information which specifies a kind of the communication apparatus to the information apparatus through the external apparatus connection detection line, and when a connection between the communication apparatus and the information apparatus is detected, detection of a kind of connected apparatus by the identification signal is periodically executed.

In another preferred construction, the connection detection signal has a signal mode of transmitting information using two kinds of signals, the communication apparatus, when predetermined one of the two kinds of signals is transmitted as the connection detection signal, determines that the communication apparatus and the information apparatus are connected and when the other signal is transmitted, determines that the communication apparatus and the information apparatus are yet to be connected, and when a connection between the communication apparatus and the information apparatus is detected, detection of a kind of connected apparatus by the identification signal is periodically executed.

In another preferred construction, the connection detection signal has a signal mode of transmitting information using two kinds of signals, the communication apparatus has a function of transmitting an identification signal indicative of information which specifies a kind of the communication apparatus to the information apparatus through the external apparatus connection detection line, and when predetermined one of the two kinds of signals is transmitted as the connection detection signal, determines that the communication apparatus and the information apparatus are connected and when the other signal is transmitted, determines that the communication apparatus and the information apparatus are yet to be connected, and when a connection between the communication apparatus and the information apparatus is detected, detection of a kind of connected apparatus by the identification signal is periodically executed.

In another preferred construction, detection of a connection between the communication apparatus and the information apparatus by the connection detection signal is periodically executed, and when a connection between the communication apparatus and the information apparatus is detected, detection of a kind of connected apparatus by the identification signal is periodically executed.

In another preferred construction, the communication apparatus has a function of transmitting an identification signal indicative of information which specifies a kind of the communication apparatus to the information apparatus through the external apparatus connection detection line, and when a connection between the communication apparatus and the information apparatus is detected, detection of a kind of connected apparatus by the identification signal is periodically executed.

In another preferred construction, the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, the communication apparatus has a function of transmitting an identification signal indicative of information which specifies a kind of the communication apparatus to the information apparatus through the external apparatus connection detection line, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, the connection detection signal has a signal mode of transmitting information using two kinds of signals, the communication apparatus, when predetermined one of the two kinds of signals is transmitted as the connection detection signal, determines that the communication apparatus and the information apparatus are connected and when the other signal is transmitted, determines that the communication apparatus and the information apparatus are yet to be connected, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, the connection detection signal has a signal mode of transmitting information using two kinds of signals, the communication apparatus has a function of transmitting an identification signal indicative of information which specifies a kind of the communication apparatus to the information apparatus through the external apparatus connection detection line, and when predetermined one of the two kinds of signals is transmitted as the connection detection signal, determines that the communication apparatus and the information apparatus are connected and when the other signal is transmitted, determines that the communication apparatus and the information apparatus are yet to be connected, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, the communication apparatus has a function of transmitting an identification signal indicative of information which specifies a kind of the communication apparatus to the information apparatus through the external apparatus connection detection line, an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, the connection detection signal has a signal mode of transmitting information using two kinds of signals, the communication apparatus, when predetermined one of the two kinds of signals is transmitted as the connection detection signal, determines that the communication apparatus and the information apparatus are connected and when the other signal is transmitted, determines that the communication apparatus and the information apparatus are yet to be connected, an apparatus as a transmission source of the identification signal has a function of transmitting, to a reception side apparatus, a START signal notifying that a signal flowing on the external apparatus connection detection line is to be switched from the connection detection signal to the identification signal, and an end signal notifying that a signal flowing on the external apparatus connection detection line is to be restored from the identification signal to the connection detection signal, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, detection of a connection between the communication apparatus and the information apparatus by the connection detection signal is periodically executed, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

In another preferred construction, when a connection between the communication apparatus and the information apparatus is detected, detection of a kind of connected apparatus by the identification signal is periodically executed, and the communication apparatus or the information apparatus detects a currently and actually usable function based on a kind of function that a connection destination apparatus has and based on whether a connection is established with the connection destination apparatus or not, and operates the apparatus to set a kind of instruction that a user is allowed to issue corresponding to the actually usable function.

Also, the communication apparatus is a portable telephone.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
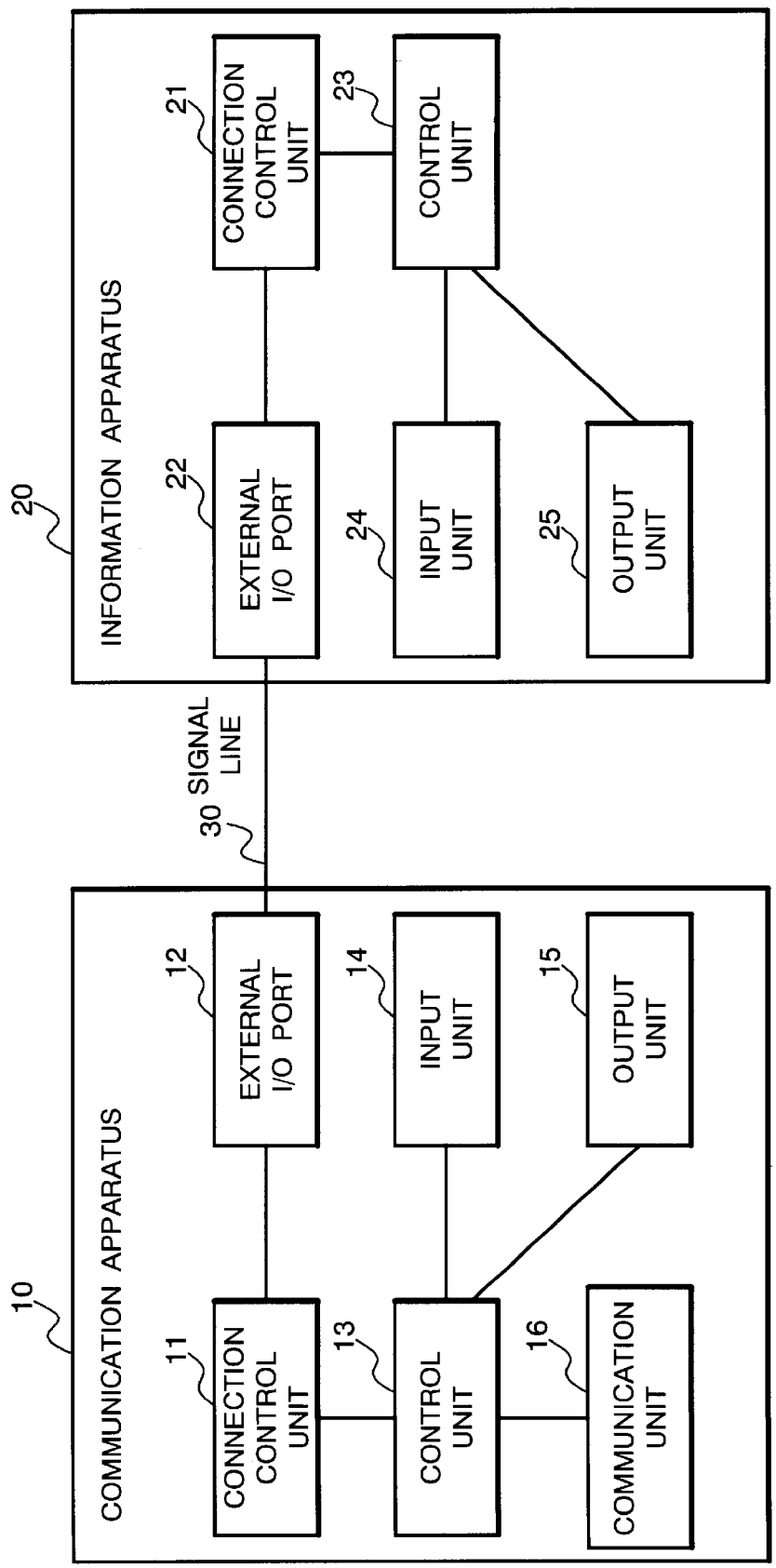
FIG. 1 is a block diagram showing a structure of a connected apparatus detection system according to a first embodiment of the present invention.

FIG. 1 is a block diagram showing a structure of a connected apparatus detection system according to a first embodiment of the present invention.

With reference to FIG. 1, the connected apparatus detection system according to the present embodiment has a communication apparatus 10 and an information apparatus 20 connected to each other through a signal line 30 from external I/O ports 12 and 22, respectively.

The communication apparatus 10 has a function of communication by means of radio and telephone lines etc. and a function of connecting with the information apparatus 20 to externally transmit information of the information apparatus 20 and transmitting external information to the information apparatus 20. As the communication apparatus 10, an apparatus such as a portable phone can be applied.

The communication apparatus 10 has, in addition to a function for communication including a control unit 13 for controlling each unit inside the apparatus, an input unit 14 implemented by number buttons, a microphone or the like, an output unit 15 such as a speaker or a liquid crystal display, and a communication unit 16 for transmitting and receiving information by means of radio or the like, a function for connection with the information apparatus 20 including the external I/O port 12 and a connection control unit 11.

The information apparatus 20 has a function of executing various kinds of information processing and is capable of externally transmitting and receiving information and also has a function of connecting with other communication apparatuses. As the information apparatus 20, apparatuses such as a note-type personal computer and PDA (Personal Digital Assistants) can be applied.

In addition to a function of information processing including a control unit 23 for controlling each unit inside the apparatus, an input unit 24 implemented by a keyboard, a mouse, an input pen or the like and an output unit 25 implemented by a liquid crystal display etc., the information apparatus 20 includes the external I/O port 22 and a connection control unit 21 as a function of connecting with the communication apparatus 10.

The signal line 30 has its opposite ends attached to the external I/O ports 12 and 22 of the communication apparatus 10 and the information apparatus 20, respectively, to establish a connection between the communication apparatus 10 and the information apparatus 20.

The connection control units 11 and 21, through the external I/O ports 12 and 22 and the signal line 30, conducts communication processing with an external apparatus and connected apparatus detection processing of determining whether an external apparatus is connected, storing information of an identification signal indicative of a kind of each apparatus, transmitting an identification signal, and detecting a kind of external apparatus connected and information about the setting adapted to the external apparatus from a received identification signal, and adapting setting contents of the apparatus to those of the connected external apparatus.

Figure 2:
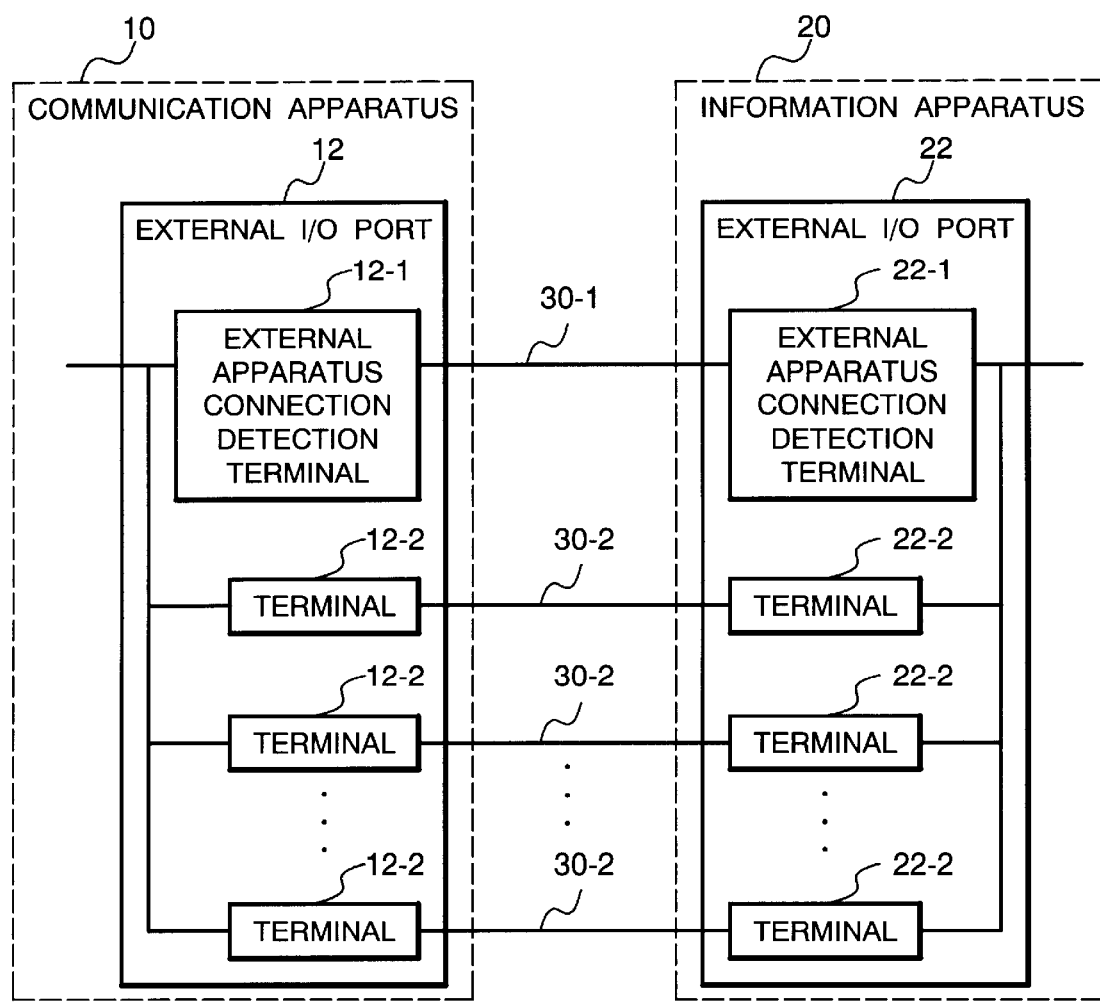
FIG. 2 is a block diagram showing a structure of a signal line and an external I/O port according to the first embodiment of the present invention.

FIG. 2 is a block diagram showing a structure of the signal line 30 and the external I/O ports 12 and 22 according to the first embodiment of the present invention.

With reference to FIG. 2, the signal line 30 of the present embodiment has a plurality of lines including an external apparatus connection detection line 30-1, and the external I/O ports 12 and 22 of the present embodiment are composed of a plurality input/output terminals including external apparatus connection detection terminals 12-1 and 22-1 which connect opposite ends of the external apparatus connection detection line 30-1.

The external apparatus connection detection line 30-1 is a line for the communication of a signal for use in detecting a connection of an external apparatus.

Figure 3:
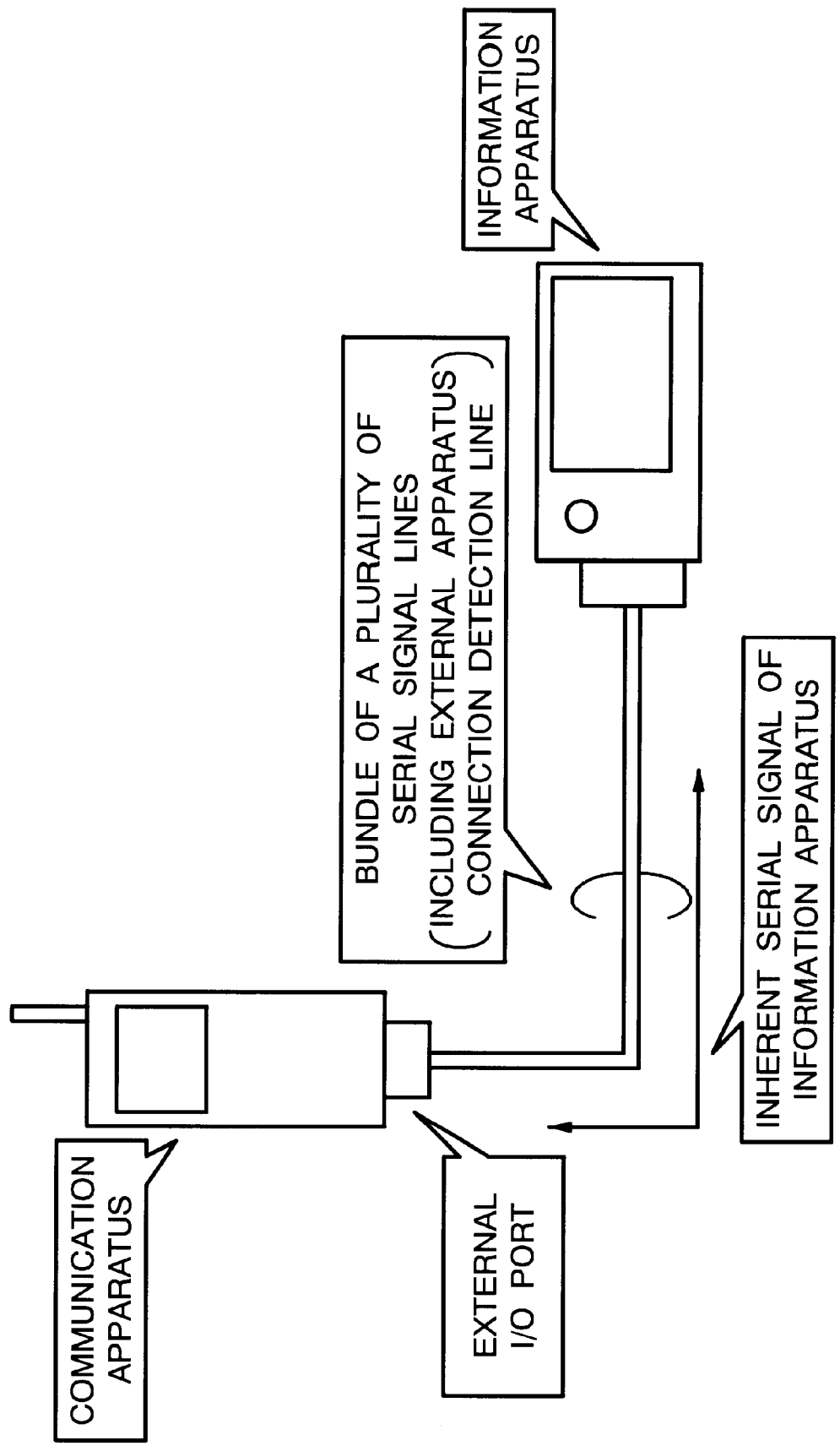
FIG. 3 is a diagram showing a mode of connection between a communication apparatus and an information apparatus according to the first embodiment of the present invention.

FIG. 3 is a diagram showing a mode of connection between a communication apparatus and an information apparatus according to the first embodiment of the present invention.

With reference to FIG. 3, in the present embodiment, the communication apparatus 10 such as a portable telephone and the information apparatus 20 such as a note-type personal computer or a PDA are connected to each other through the signal line 30 from the external I/O ports 12 and 22, respectively.

In the present embodiment, on the external apparatus connection detection line 30-1 in the signal line 30, transmission and reception of a connection detection signal indicating whether an external apparatus is connected or not are conducted and an identification signal indicative of a kind of each apparatus is transmitted to and from each other.

In addition, in the communication apparatus 10, the current setting is changed to setting adapted to the information apparatus 20 connected.

Figure 4:
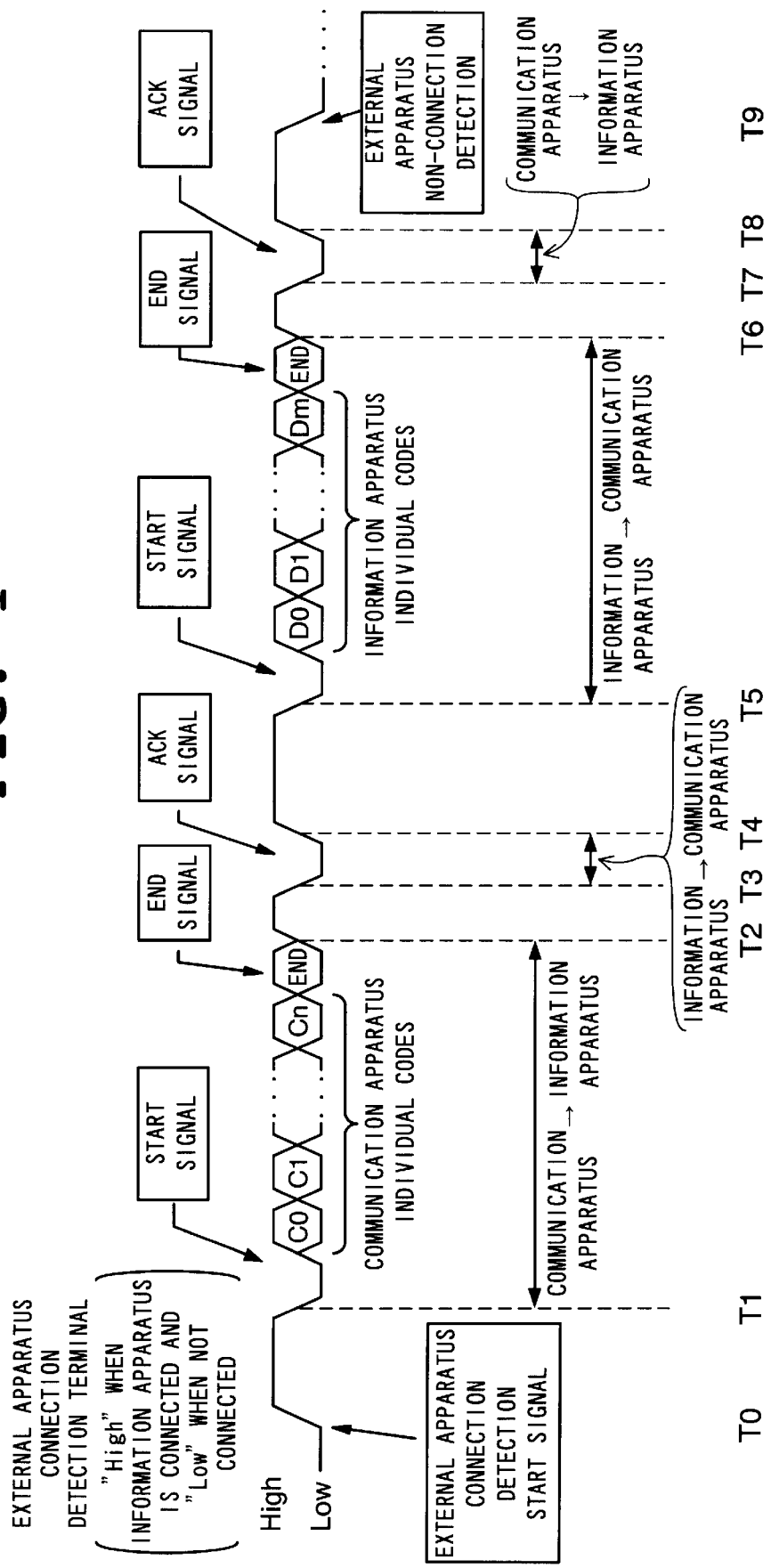
FIG. 4 is a timing chart showing one example of a format of communication related to external apparatus connection detection processing according to the first embodiment of the present invention.

FIG. 4 is a timing chart showing one example of a format of communication related to external apparatus connection detection processing according to the first embodiment of the present invention.

Communication illustrated in FIG. 4 for the connected apparatus detection between the communication apparatus 10 and the information apparatus 20 of the present embodiment is conducted by the connection control units 11 and 21 of each apparatus through the external apparatus connection detection terminals 12-1 and 22-1 and the external apparatus connection detection line 30-1, in which a connection detection signal indicating whether an external apparatus is connected or not and an identification signal indicative of a kind of each apparatus are transmitted and received.

In the present embodiment, assume that communication is conducted using two values of data, "High" and "Low", through the external apparatus connection detection line 30-1.

Here, "High" and "Low" are not limited to those indicative of high and low current or voltage of a signal and they may be any combination of two kinds of signals indicative of two values of logic such as "0" and "1" or "positive" and "negative". It is possible to assume that current flowing is represented as "High" and no current flowing is represented as "Low".

With the connection detection signal, "High" indicates a state where an external apparatus is connected (or a state where the same is connected and is turned on to operate) and "Low" indicates a state where an external apparatus is not connected (or a state where the same is connected but not turned on and not in operation).

In the communication of an identification signal, in addition to a part indicative of an inherent code for identification o f each apparatus ("C0, C1, . . . , Cn", "D0, D1, . . . , Dm" in FIG. 4), a START signal indicative of the start of transmission of an identification signal and an end signal indicative of the end of transmission of the identification signal are transmitted at the top and at the end, respectively, and furthermore an ACK (Acknowledge) signal notifying that a reception side apparatus has received an identification signal is transmitted.

Transmission of a START signal notifies to an apparatus on a reception side that a signal flowing on the external apparatus connection detection line 30-1 is changed from a connection detection signal to an identification signal.

Similarly, transmission of an end signal notifies to the apparatus on the reception side that a signal flowing on the external apparatus connection detection line 30-1 is changed from an identification signal to a connection detection signal.

Transmission of an ACK signal notifies to a transmission source that at an apparatus on the reception side, reception of an identification signal is completed and that re-transmission of the identification signal is unnecessary. Without the transmission of the ACK signal from the reception side, the transmission source considers that the identification signal has not been received and starts re-transmission of the identification signal.

Transmission of the START signal and the ACK signal is executed when a "High" connection detection signal indicative of connection of an external apparatus is flowing on the external apparatus connection detection line 30-1 and transmission of the end signal is executed after the transmission of an inherent code.

These inherent codes, START signal, end signal and ACK signal are formed by the transmission of sequentially combined "High" and "Low" data. Since the START signal, the end signal and ACK signal are, in particular, signals for such control as switching of a signal to be transmitted between a connection detection signal and an identification signal, they are preferably signals clearly distinguishable from other signal such as an inherent code. However, since the START signal and the ACK signal are transmitted when a "High" connection detection signal is flowing, they may be formed of START Bit and ACK Bit which are simply short (whose length is equivalent to 1 Bit of inherent code data) "Low" signals.

With reference to FIG. 4, ordinarily on the external apparatus connection detection line 30-1, a connection detection signal indicating whether an external apparatus is connected or not flows.

In FIG. 4, first at T0, the communication apparatus 10 and the information apparatus 20 are connected and the connection detection signal changes from "Low" to "High" to detect an external apparatus being newly connected.

Then, from T1 to T2, the communication apparatus 10 transmits an identification signal indicative of a kind of the communication apparatus 10 to the information apparatus 20.

The identification signal is transmitted starting with a START signal, and a signal to be transmitted is changed from a connection detection signal to an identification signal, and subsequently an inherent code (C0, C1, ..., Cn) is transmitted and lastly the end signal is transmitted to again return the signal to be transmitted to a connection detection signal.

Next, from T3 to T4, the information apparatus 20 returns an ACK signal in order to notify the communication apparatus 10 of the reception of the identification signal.

The communication apparatus 10, when receiving an affirmative acknowledge by the ACK signal, recognizes that the information apparatus 20 receives the identification signal and refrains from re-transmission of the identification signal. Return of the ACK signal may be conducted immediately after the end signal of the identification signal.

Next, from T5 to T6, this time from the information apparatus 20 to the communication apparatus 10, transmission of an identification signal indicative of a kind of the information apparatus 20 is similarly conducted.

Thereafter, from T7 to T8, the communication apparatus 10 similarly returns an ACK signal in order to notify the information apparatus 20 of the reception of the identification signal.

In addition, at T9, the connection between the communication apparatus 10 and the information apparatus 20 is released and the connection detection signal changes from "High" to "Low" to detect release of the connection with the external apparatus. Hereinafter, transmission of the identification signal will not be conducted until connection of an apparatus is again detected.

Using the foregoing format of communication on the external apparatus connection detection line 30-1, the communication apparatus 10 and the information apparatus 20 are allowed to find a kind of partner's apparatus connected to each other through communication using the external apparatus connection detection line 30-1 and change its own setting so as to conform with the partner's apparatus connected.

Figure 5:
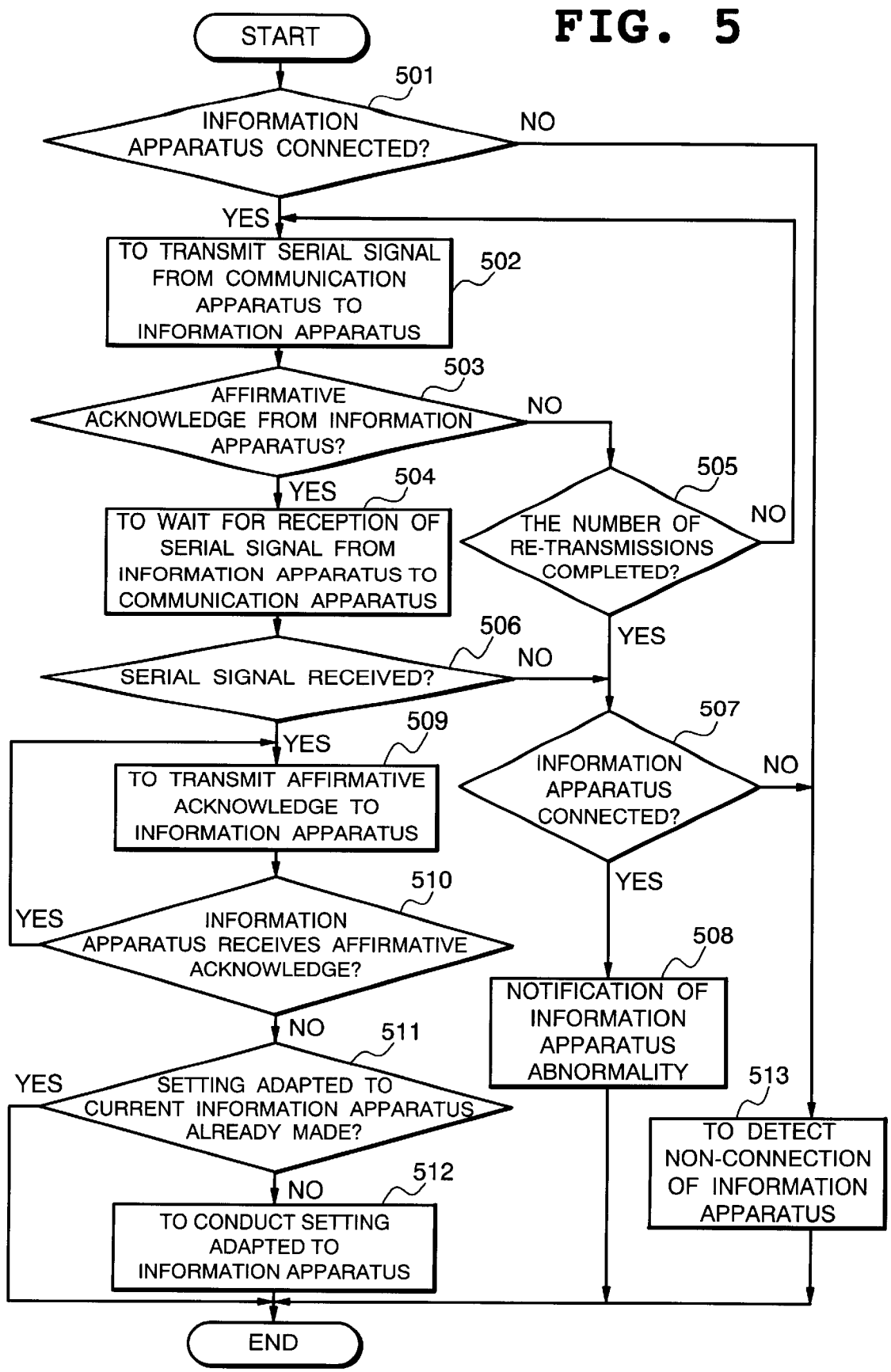
FIG. 5 is a flow chart for use in explaining connected apparatus detection processing conducted by a communication apparatus according to the first embodiment of the present invention.
Figure 6:
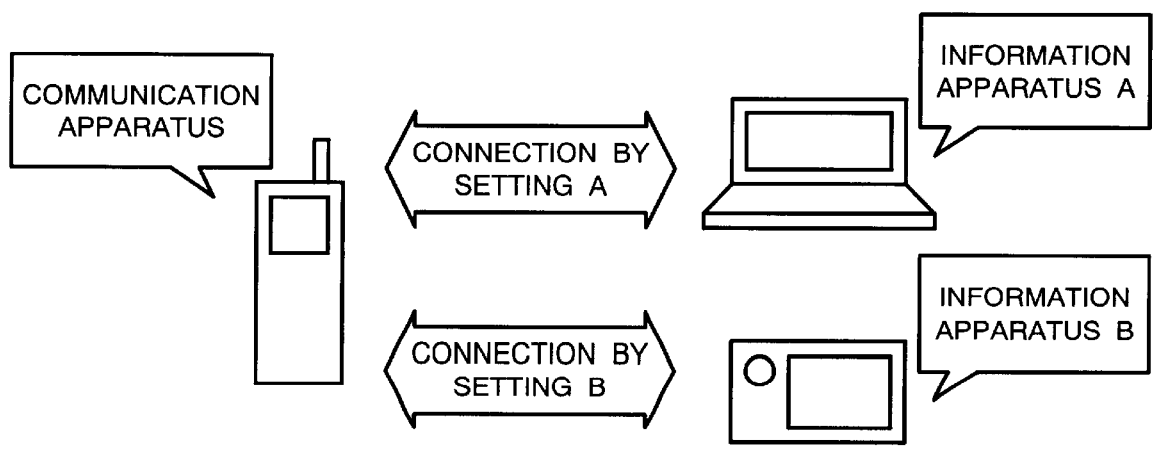
FIG. 6 is a diagram for use in explaining a connection and setting of a communication apparatus and an information apparatus according to conventional art and according to the present invention.

FIG. 5 is a flow chart for use in explaining processing of connected apparatus detection by the communication apparatus 10 according to the first embodiment of the present invention.

With reference to FIG. 5, in the connected apparatus detection processing by the communication apparatus 10 of the present embodiment, first detection is made whether the information apparatus 20 as an apparatus to be connected is connected or not (Step 501).

In this connection detecting processing, with reference to the external apparatus connection detection terminal 12-1 of the external I/O port 12, when a connection detection signal currently flowing on the external apparatus connection detection line 30-1 is "Low" and the information apparatus 20 is not connected, non-connection is detected to end the connected apparatus detection processing (Step 513). On the other hand, when the connection detection signal is "High" and the information apparatus 20 is connected, transmission is made of an identification signal indicative of information specifying a kind of the communication apparatus 10 from the external apparatus connection detection terminal 12-1 to the information apparatus 20 through the external apparatus connection detection line 30-1 (Step 502).

After the transmission of the identification signal, the communication apparatus 10 waits for reception of an affirmative acknowledge from the information apparatus 20 by the transmission of an ACK signal indicative of reception of the identification signal.

If within a predetermined waiting time, no transmission is made of the ACK signal from the information apparatus 20, considering that reception of the identification signal fails at the information apparatus 20, the communication apparatus 10 again transmits the identification signal to the information apparatus 20 and repeats re-transmission within a fixed number of re-transmission times until the ACK signal is received (Step 503). When the ACK signal is not received within the number of re-transmission times, determination is made that reception of the ACK signal fails to end re-transmission of the identification signal.

When receiving the ACK signal from the information apparatus 20 and succeeding in transmitting an identification signal to the information apparatus 20, the apparatus 10 further waits for reception of an identification signal indicative of information specifying a kind of the information apparatus 20 which is transmitted from the information apparatus 20 (Step 504).

Here, when failing to receive the ACK signal from the information apparatus 20 (Step 505) and when failing to receive the identification signal from the information apparatus 20 (Step 506), the apparatus 10 conducts the following abnormal end processing.

In the abnormal end processing, again similarly to Step 501, detection is made whether the information apparatus 20 as an apparatus to be connected is connected (Step 507) and if the connection of the information apparatus 20 is detected, considering that the information apparatus 20 side has abnormality, the apparatus 10 notifies a user of the information as the information apparatus abnormality notification by means of a speaker, a liquid crystal display or the like as the output unit 15 of the communication apparatus 10. When a connection of the information apparatus 20 is not detected, the apparatus 10 detects non-connection to similarly notify the user of the non-detection by means of the output unit 15 of the communication apparatus 10.

At Step 505, when reception of the ACK signal from the information apparatus 20 succeeds, this time the communication apparatus 10 side transmits an affirmative acknowledge from the communication apparatus 10 to the information apparatus 20 by the transmission of an ACK signal indicative of reception of an identification signal (Step 509).

Here, also on the side of the information apparatus 20, re-transmission of an identification signal is conducted by the same processing as that at the above-described Steps 503, 505 and 502 until the ACK signal from the communication apparatus 10 is correctly received.

Therefore, when receiving re-transmission of the identification signal from the information apparatus 20, the communication apparatus 10 re-transmits the ACK signal because the information apparatus 20 is yet to receive the ACK signal. In addition, when a state where no re-transmission of the identification signal lasts longer than a predetermined time longer than the waiting time for waiting for the ACK signal of the information apparatus 20, the apparatus 10 considers that the information apparatus 20 receives the ACK signal (Step 510).

The foregoing procedures enable the communication apparatus 10 and the information apparatus 20 to recognize a kind of partner's apparatus connected to each other by means of a received identification signal.

Next, the communication apparatus 10 conducts setting processing of appropriately adjusting the setting based on information about the kind of the information apparatus 20.

In the setting processing, first compare the current setting contents of the communication apparatus 10 and the setting contents adapted to the connected information apparatus 20. If the setting adapted to the information apparatus 20 is already made, end the connected apparatus detection processing (Step 511) and if the setting adapted to the information apparatus 20 and the current setting differ from each other, execute processing of changing the setting of the communication apparatus 10 into the adapted setting to end the connected apparatus detection processing (Step 512).

In addition, the processing of ending the detection of the information apparatus 20 which is executed when no connection is detected by the check of the connection of the information apparatus 20 at the above Steps 507 and 513 may be further conducted every time reception of the ACK signal from the information apparatus 20 fails (between Step 503 and Step 505).

The connected apparatus detection processing in the above flow chart is conducted when a connection with an external apparatus (that is, connection between the communication apparatus 10 and the information apparatus 20) is newly detected, and after the one execution of the connected apparatus detection processing, for the communication apparatus 10 or the like to constantly confirm that the connection of the external apparatus is not released halfway, a connection detection signal on the external apparatus connection detection line 30-1 is monitored. Also, after one execution of the connected apparatus detection processing, the connected apparatus detection processing may be periodically executed.

Possible methods of recognizing, at an apparatus which receives an identification signal, setting for communication or the like as information regarding an apparatus as an identification signal transmission source are in advance inputting and storing necessary information to and in a reception side apparatus by a user, in advance storing, inside a reception side apparatus, various detailed setting data of a transmission source corresponding to data of a kind of the transmission source apparatus which is sent by an identification signal, transmitting data for use in various setting as an identification signal together with data such as a name of a kind of apparatus from a transmission side apparatus, and a combination of these methods.

As to the processing of an identification signal of the communication apparatus 10 received by the information apparatus 20, the information apparatus 20 side is similarly allowed to conduct setting adapted to the communication apparatus 10, as well as executing processing such as displaying of information of the communication apparatus 10 for a user by means of the output unit 25 such as a display.

In addition, although in the present embodiment, transmission of information about a kind of apparatus by an identification signal is conducted by both of the communication apparatus 10 and the information apparatus 20, since setting change is not necessarily required at both of the apparatuses, transmission of the identification signal may be conducted at one of the sides which is to change the setting.

Also in the connected apparatus detection system of the present invention, the information apparatus 20 (or also the communication apparatus 10) is not necessarily realized by hardware such as an electronic circuit and the above-described functions may by realized by software.

As described in the foregoing, the connected apparatus detection system of the present embodiment eliminates the need of complicated setting work every time new connection or switching is made and enables appropriate setting for communication or the like adapted to an apparatus as a connection destination to be conducted automatically.

Next, another embodiment of the present invention will be described.

The embodiment of the present invention is to adapt, at the communication apparatus 10 or the information apparatus 20, a function enabling execution of an instruction from a user to a currently usable function in practice. This is realized by changing a range of selection of instructions displayed on a display of an apparatus into that composed of currently executable appropriate instructions based on a usable function which an apparatus as a connection destination has and which is detected from a received identification signal of the connection destination apparatus and based on a connection detection signal indicating whether a connection is established with the connection destination apparatus or not.

The present embodiment prevents confusion of a user and realizes high operability.

As described in the foregoing, the connected apparatus detection system of the present invention attains the following effects.

First, since the system has a function of transmitting an identification signal as information for specifying a kind of apparatus to a connection destination apparatus to allow an apparatus which receives the identification signal to automatically conduct various kinds of setting adapted to an apparatus as a transmission source, no complicated setting work is necessary every time new connection or switching is conducted, whereby appropriate setting for communication or the like adapted to the connection destination apparatus can be conducted automatically. In addition, real-time check is possible whether the connection destination apparatus is currently connected or not.

Secondly, since the system is structured such that transmission of the above-described identification signal to a connection destination apparatus is conducted through a signal line of an existing standard and also using an external apparatus connection detection line as a dedicated line for detecting a connection of the connection destination apparatus other than a line for communicating voice and transmission data in the signal line, none of new lines etc. for the transmission of an identification signal is required and even when an identification signal is erroneously transmitted to an apparatus having none of reception functions, there will occur no transmission of false transmission data, so that the system can be adapted to a connection with an apparatus of an existing standard.

Thirdly, by detecting information such as a kind of apparatus as a connection destination by the reception of the above-described identification signal, it is possible to set a function enabling execution of an instruction from a user so as to be adapted to a usable function that the connection destination apparatus has and to correspond to a case where a connection is established with the connection destination apparatus and a case where the same is not established, thereby realizing prevention of user's confusion and high operability.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A system for externally transmitting and receiving information of an information apparatus by means of a communication function of a communication apparatus, with said communication apparatus and said information apparatus connected, wherein
    a signal line for use in the connection between said communication apparatus and said information apparatus includes an external apparatus connection detection line for transmitting and receiving a connection detection signal indicating whether said communication apparatus and said information apparatus are connected or not,
    said information apparatus
        has a function of transmitting an identification signal indicative of information which specifies a kind of said information apparatus through said external apparatus connection detection line, and
    said communication apparatus
        has a function of receiving said identification signal to change setting of said communication apparatus into setting contents adapted to said information apparatus.

2. The connected apparatus detection system as set forth in claim 1, wherein
    said communication apparatus
        has a function of transmitting an identification signal indicative of information which specifies a kind of said communication apparatus to said information apparatus through said external apparatus connection detection line.

3. The connected apparatus detection system as set forth in claim 1, wherein
    said connection detection signal
        has a signal mode of transmitting information using two kinds of signals, and
    said communication apparatus,
        when predetermined one of said two kinds of signals is transmitted as said connection detection signal, determines that said communication apparatus and said information apparatus are connected and when the other signal is transmitted, determines that said communication apparatus and said information apparatus are yet to be connected.

4. The connected apparatus detection system as set forth in claim 1, wherein
    said connection detection signal has a signal mode of transmitting information using two kinds of signals, and
    said communication apparatus
        has a function of transmitting an identification signal indicative of information which specifies a kind of said communication apparatus to said information apparatus through said external apparatus connection detection line, and
        when predetermined one of said two kinds of signals is transmitted as said connection detection signal, determines that said communication apparatus and said information apparatus are connected and when the other signal is transmitted, determines that said communication apparatus and said information apparatus are yet to be connected.

5. The connected apparatus detection system as set forth in claim 1, wherein
    an apparatus as a transmission source of said identification signal
        has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal.

6. The connected apparatus detection system as set forth in claim 1, wherein
    said communication apparatus
        has a function of transmitting an identification signal indicative of information which specifies a kind of said communication apparatus to said information apparatus through said external apparatus connection detection line, and
    an apparatus as a transmission source of said identification signal
        has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal.

7. The connected apparatus detection system as set forth in claim 1, wherein
    said connection detection signal has a signal mode of transmitting information using two kinds of signals,
    said communication apparatus,
        when predetermined one of said two kinds of signals is transmitted as said connection detection signal, determines that said communication apparatus and said information apparatus are connected and when the other signal is transmitted, determines that said communication apparatus and said information apparatus are yet to be connected, and
    an apparatus as a transmission source of said identification signal
        has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal.

8. The connected apparatus detection system as set forth in claim 1, wherein said connection detection signal has a signal mode of transmitting information using two kinds of signals, said communication apparatus has a function of transmitting an identification signal indicative of information which specifies a kind of said communication apparatus to said information apparatus through said external apparatus connection detection line, and when predetermined one of said two kinds of signals is transmitted as said connection detection signal, determines that said communication apparatus and said information apparatus are connected and when the other signal is transmitted, determines that said communication apparatus and said information apparatus are yet to be connected, and an apparatus as a transmission source of said identification signal has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal.

9. The connected apparatus detection system as set forth in claim 1, wherein detection of a connection between said communication apparatus and said information apparatus by said connection detection signal is periodically executed.

10. The connected apparatus detection system as set forth in claim 1, wherein said communication apparatus has a function of transmitting an identification signal indicative of information which specifies a kind of said communication apparatus to said information apparatus through said external apparatus connection detection line, and detection of a connection between said communication apparatus and said information apparatus by said connection detection signal is periodically executed.

11. The connected apparatus detection system as set forth in claim 1, wherein said connection detection signal has a signal mode of transmitting information using two kinds of signals, said communication apparatus, when predetermined one of said two kinds of signals is transmitted as said connection detection signal, determines that said communication apparatus and said information apparatus are connected and when the other signal is transmitted, determines that said communication apparatus and said information apparatus are yet to be connected, and detection of a connection between said communication apparatus and said information apparatus by said connection detection signal is periodically executed.

12. The connected apparatus detection system as set forth in claim 1, wherein said connection detection signal has a signal mode of transmitting information using two kinds of signals, said communication apparatus has a function of transmitting an identification signal indicative of information which specifies a kind of said communication apparatus to said information apparatus through said external apparatus connection detection line, and when predetermined one of said two kinds of signals is transmitted as said connection detection signal, determines that said communication apparatus and said information apparatus are connected and when the other signal is transmitted, determines that said communication apparatus and said information apparatus are yet to be connected, and detection of a connection between said communication apparatus and said information apparatus by said connection detection signal is periodically executed.

13. The connected apparatus detection system as set forth in claim 1, wherein an apparatus as a transmission source of said identification signal has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal, and detection of a connection between said communication apparatus and said information apparatus by said connection detection signal is periodically executed.

14. The connected apparatus detection system as set forth in claim 1, wherein when a connection between said communication apparatus and said information apparatus is detected, detection of a kind of connected apparatus by said identification signal is periodically executed.

15. The connected apparatus detection system as set forth in claim 1, wherein said communication apparatus has a function of transmitting an identification signal indicative of information which specifies a kind of said communication apparatus to said information apparatus through said external apparatus connection detection line, and when a connection between said communication apparatus and said information apparatus is detected, detection of a kind of connected apparatus by said identification signal is periodically executed.

16. The connected apparatus detection system as set forth in claim 1, wherein said connection detection signal has a signal mode of transmitting information using two kinds of signals, said communication apparatus, when predetermined one of said two kinds of signals is transmitted as said connection detection signal, determines that said communication apparatus and said information apparatus are connected and when the other signal is transmitted, determines that said communication apparatus and said information apparatus are yet to be connected, and when a connection between said communication apparatus and said information apparatus is detected, detection of a kind of connected apparatus by said identification signal is periodically executed.

17. The connected apparatus detection system as set forth in claim 1, wherein
said connection detection signal
has a signal mode of transmitting information using two kinds of signals,
said communication apparatus
has a function of transmitting an identification signal indicative of information which specifies a kind of said communication apparatus to said information apparatus through said external apparatus connection detection line, and
when predetermined one of said two kinds of signals is transmitted as said connection detection signal, determines that said communication apparatus and said information apparatus are connected and when the other signal is transmitted, determines that said communication apparatus and said information apparatus are yet to be connected, and
when a connection between said communication apparatus and said information apparatus is detected, detection of a kind of connected apparatus by said identification signal is periodically executed.

18. The connected apparatus detection system as set forth in claim 1, wherein
detection of a connection between said communication apparatus and said information apparatus by said connection detection signal is periodically executed, and
when a connection between said communication apparatus and said information apparatus is detected, detection of a kind of connected apparatus by said identification signal is periodically executed.

19. The connected apparatus detection system as set forth in claim 1, wherein
said communication apparatus
has a function of transmitting an identification signal indicative of information which specifies a kind of said communication apparatus to said information apparatus through said external apparatus connection detection line, and
when a connection between said communication apparatus and said information apparatus is detected, detection of a kind of connected apparatus by said identification signal is periodically executed.

20. The connected apparatus detection system as set forth in claim 1, wherein
said communication apparatus or said information apparatus
detects a currently and actually usable function based on a kind of function that a connection destination apparatus has and based on whether a connection is established with the connection destination apparatus or not, and
operates the apparatus to set a kind of instruction that a user is allowed to issue corresponding to said actually usable function.

21. The connected apparatus detection system as set forth in claim 1, wherein
said communication apparatus
has a function of transmitting an identification signal indicative of information which specifies a kind of said communication apparatus to said information apparatus through said external apparatus connection detection line, and
said communication apparatus or said information apparatus
detects a currently and actually usable function based on a kind of function that a connection destination apparatus has and based on whether a connection is established with the connection destination apparatus or not, and
operates the apparatus to set a kind of instruction that a user is allowed to issue corresponding to said actually usable function.

22. The connected apparatus detection system as set forth in claim 1, wherein
said connection detection signal has a signal mode of transmitting information using two kinds of signals,
said communication apparatus,
when predetermined one of said two kinds of signals is transmitted as said connection detection signal, determines that said communication apparatus and said information apparatus are connected and when the other signal is transmitted, determines that said communication apparatus and said information apparatus are yet to be connected, and
said communication apparatus or said information apparatus
detects a currently and actually usable function based on a kind of function that a connection destination apparatus has and based on whether a connection is established with the connection destination apparatus or not, and
operates the apparatus to set a kind of instruction that a user is allowed to issue corresponding to said actually usable function.

23. The connected apparatus detection system as set forth in claim 1, wherein
said connection detection signal
has a signal mode of transmitting information using two kinds of signals,
said communication apparatus
has a function of transmitting an identification signal indicative of information which specifies a kind of said communication apparatus to said information apparatus through said external apparatus connection detection line, and
when predetermined one of said two kinds of signals is transmitted as said connection detection signal, determines that said communication apparatus and said information apparatus are connected and when the other signal is transmitted, determines that said communication apparatus and said information apparatus are yet to be connected, and
said communication apparatus or said information apparatus
detects a currently and actually usable function based on a kind of function that a connection destination apparatus has and based on whether a connection is established with the connection destination apparatus or not, and
operates the apparatus to set a kind of instruction that a user is allowed to issue corresponding to said actually usable function.

24. The connected apparatus detection system as set forth in claim 1, wherein
an apparatus as a transmission source of said identification signal
has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal, and said communication apparatus or said information apparatus detects a currently and actually usable function based on a kind of function that a connection destination apparatus has and based on whether a connection is established with the connection destination apparatus or not, and operates the apparatus to set a kind of instruction that a user is allowed to issue corresponding to said actually usable function.

25. The connected apparatus detection system as set forth in claim 1, wherein said communication apparatus has a function of transmitting an identification signal indicative of information which specifies a kind of said communication apparatus to said information apparatus through said external apparatus connection detection line, an apparatus as a transmission source of said identification signal has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal, and said communication apparatus or said information apparatus detects a currently and actually usable function based on a kind of function that a connection destination apparatus has and based on whether a connection is established with the connection destination apparatus or not, and operates the apparatus to set a kind of instruction that a user is allowed to issue corresponding to said actually usable function.

26. The connected apparatus detection system as set forth in claim 1, wherein said connection detection signal has a signal mode of transmitting information using two kinds of signals, said communication apparatus, when predetermined one of said two kinds of signals is transmitted as said connection detection signal, determines that said communication apparatus and said information apparatus are connected and when the other signal is transmitted, determines that said communication apparatus and said information apparatus are yet to be connected, an apparatus as a transmission source of said identification signal has a function of transmitting, to a reception side apparatus, a START signal notifying that a signal flowing on said external apparatus connection detection line is to be switched from said connection detection signal to said identification signal, and an end signal notifying that a signal flowing on said external apparatus connection detection line is to be restored from said identification signal to said connection detection signal, and said communication apparatus or said information apparatus detects a currently and actually usable function based on a kind of function that a connection destination apparatus has and based on whether a connection is established with the connection destination apparatus or not, and operates the apparatus to set a kind of instruction that a user is allowed to issue corresponding to said actually usable function.

27. The connected apparatus detection system as set forth in claim 1, wherein detection of a connection between said communication apparatus and said information apparatus by said connection detection signal is periodically executed, and said communication apparatus or said information apparatus detects a currently and actually usable function based on a kind of function that a connection destination apparatus has and based on whether a connection is established with the connection destination apparatus or not, and operates the apparatus to set a kind of instruction that a user is allowed to issue corresponding to said actually usable function.

28. The connected apparatus detection system as set forth in claim 1, wherein when a connection between said communication apparatus and said information apparatus is detected, detection of a kind of connected apparatus by said identification signal is periodically executed, and said communication apparatus or said information apparatus detects a currently and actually usable function based on a kind of function that a connection destination apparatus has and based on whether a connection is established with the connection destination apparatus or not, and operates the apparatus to set a kind of instruction that a user is allowed to issue corresponding to said actually usable function.

29. The connected apparatus detection system as set forth in claim 1, wherein said communication apparatus is a portable telephone.

* * * * *